(12) United States Patent
Braham

(10) Patent No.: US 10,114,412 B1
(45) Date of Patent: Oct. 30, 2018

(54) LAPDESK

(71) Applicant: Julaine Olivene Braham, Miami, FL (US)

(72) Inventor: Julaine Olivene Braham, Miami, FL (US)

( * ) Notice: Subject to any disclaimer, the term of this patent is extended or adjusted under 35 U.S.C. 154(b) by 0 days.

(21) Appl. No.: 15/970,929

(22) Filed: May 4, 2018

(51) Int. Cl.
*G06F 1/16* (2006.01)

(52) U.S. Cl.
CPC .......... *G06F 1/1624* (2013.01); *G06F 1/1681* (2013.01); *G06F 1/1616* (2013.01)

(58) Field of Classification Search
CPC .............................. G06F 1/1624; G06F 1/1656
See application file for complete search history.

(56) References Cited

U.S. PATENT DOCUMENTS

| | | | | |
|---|---|---|---|---|
| 5,490,039 A * | 2/1996 | Helms | ............... | G06F 1/1616 361/679.55 |
| 5,570,268 A * | 10/1996 | Selker | ............... | G06F 1/1616 361/679.19 |
| 5,596,481 A * | 1/1997 | Liu | ............... | G06F 1/1616 248/118.1 |
| 5,901,934 A * | 5/1999 | Wilson | ............... | G06F 3/0395 248/346.01 |
| 6,025,986 A * | 2/2000 | Sternglass | ............... | G06F 1/1616 248/118.1 |
| 6,353,530 B1 * | 3/2002 | Zarek | ............... | G06F 1/1616 108/131 |
| 6,507,483 B2 * | 1/2003 | Oura | ............... | A47B 21/0371 248/118.3 |
| 6,619,597 B1 * | 9/2003 | Sheppard | ............... | A47B 21/0371 248/118 |
| 6,757,159 B2 * | 6/2004 | Zarek | ............... | G06F 1/1616 108/43 |
| 6,947,026 B2 * | 9/2005 | Mattson | ............... | G06F 3/0395 248/346.01 |
| 6,961,246 B2 * | 11/2005 | Dickey | ............... | G06F 1/181 248/286.1 |
| 7,798,072 B2 * | 9/2010 | Becker | ............... | B60N 3/002 108/42 |
| 7,870,937 B1 * | 1/2011 | Arnao | ............... | A45C 9/00 190/1 |
| 7,922,141 B1 * | 4/2011 | Ramsarran | ............... | G06F 3/0395 248/118 |
| 8,199,490 B2 * | 6/2012 | Wilkenfeld | ............... | F16M 13/00 361/679.02 |
| 8,752,912 B1 * | 6/2014 | Johns | ............... | A47B 13/023 312/241 |
| 2005/0206283 A1 * | 9/2005 | Stiles | ............... | G06F 3/0395 312/330.1 |
| 2013/0100027 A1 * | 4/2013 | Wang | ............... | G06F 1/1643 345/168 |

* cited by examiner

*Primary Examiner* — Anthony Q Edwards
(74) *Attorney, Agent, or Firm* — James M. Smedley LLC; James Michael Smedley, Esq.

(57) ABSTRACT

A lapdesk is described herein. The lapdesk may include a hard shell, an ejection button, and an embedded desk. The embedded desk may be ejected from the hard shell case after the ejection button is pushed. The embedded desk may be folded over a keyboard of the laptop to create a functional workspace. The embedded desk may have clips to secure it in place and at least one hinge. The embedded desk may have a transparent corner. The embedded desk may eject from either a side or front of the hard shell case.

18 Claims, 2 Drawing Sheets

LAPDESK

FIELD OF INVENTION

This application is in the field of laptop computer cases.

BACKGROUND

Generally laptop users utilize a case to prevent damage to the computer itself. The laptop case prevents scratches, dents, breaking, and the like. In some cases, the laptop case may absorb impact to prevent internal damage.

Laptops are portable convenient for traveling. In small spaces, however, the laptop may take over an entire workspace leaving no room for note taking when watching a lecture, for snacks and drinks while watching a movie on an airplane, or the like while in other limited space environments.

A need exists for a laptop case that would provide a functional workspace to a user when in limited space environments.

SUMMARY

A lapdesk is described herein. The lapdesk may include a hard shell, an ejection button, and an embedded desk. The embedded desk may be ejected from the hard shell case after the ejection button is pushed. The embedded desk may be folded over a keyboard of the laptop to create a functional workspace. The embedded desk may have clips to secure it in place and at least one hinge. The embedded desk may have a transparent corner. The embedded desk may eject from either a side or front of the hard shell case.

DETAILED DESCRIPTION OF THE DRAWINGS

Figure 1:
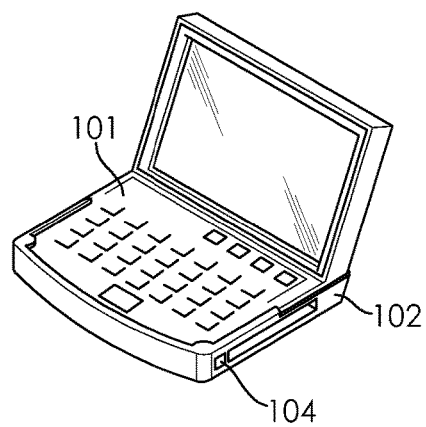
FIG. 1 is an example of a lapdesk with a laptop and hard shell case.

This invention is described in the following description with reference to the Figures, in which like reference numbers represent the same or similar elements. While this invention is described in terms of modes for achieving this invention's objectives, it will be appreciated by those skilled in the art that variations may be accomplished in view of these teachings without deviating from the spirit or scope of the present invention. The embodiments and variations of the invention described herein, and/or shown in the drawings, are presented by way of example only and are not limiting as to the scope of the invention.

Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A laptop case that may be able to transform a keyboard into a functional workspace for a laptop user. The functional workspace may be ejectable from a base of a lower hard shell case. The functional workspace may be positioned to lie directly over the keyboard. The functional workspace may be able to pop in and out of the hard shell case like a CD-ROM. The functional workspace (desk, embedded desk, or extended piece) may fold over the keyboard.

When the desk or extended piece is folded over the keyboard, it may create several functional purposes. For example, the functional workspace may provide a desk for note taking while watching a lecture or provide a place for snacks and drinks while watching a movie on an airplane or other environments with limited space. This functional workspace modification may provide the laptop user a functional lightweight working desk on the go.

Additionally, the play, pause, up and down scroll buttons, power, and volume buttons may remain accessible to the user when the functional workspace is in place. These buttons may be protected by water proof silicone. The power and USB ports may also remain accessible to the user.

The extended piece may also lock into place as a side desk with extendable legs for stability. In this position, the keyboard may remain fully accessible with the functional workspace being extendable on either the left or right side as desired by the user.

A hard shell laptop case, may transform a keyboard into a functional flat surface for laptop users. This modification may be directed only to the bottom piece of the hard shell laptop case. The bottom piece may have a hard/rigid material embedded within it. This material may be ejectable like a CD-ROM from the base of the lower hard shell. Once ejected, the functional flat surface may extend above, and fold on top of the keyboard, and lock in place. This may create a desk in the form of a flat surface.

This desk may be used for many functional purposes, for example, to provide a desk for note taking when watching a lecture, for snacks and drinks while watching a movie on an airplane or while in other space limited environments. This lightweight working desk on the go may allow for the several buttons to remain accessible to the user while the desk is in place, for example, play, pause, up and down scroll, power and volume. In order to enable simultaneous use of both desk and keyboard, the desk may be extended forward, or raised up, in a sliding motion and locked in place.

This modification may include other features, for example, the ability for the hard/rigid material to be locked in place on the side, of the hard shell case, once ejected with extendable legs for stability. In this position the keyboard may remain fully accessible to the user.

An advantage of this embedded desk over others may be to provide a lightweight, easy and convenient desk on the go or when in space limited areas.

FIG. 1 is an example of a lapdesk with a laptop and a hard shell case. A laptop 101 may have a hard shell case 102. The hard shell case 102 may include an embedded desk 103. The hard shell case 102 may have an ejection button 104 to eject the embedded desk 103 from the hard shell case 102.

Figure 2:
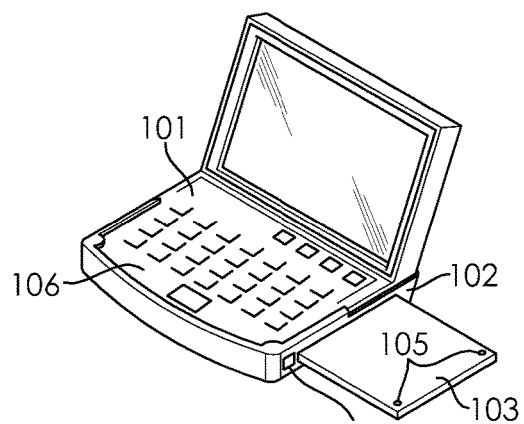
FIG. 2 is a first example of the embedded desk ejected from the hard shell case.

FIG. 2 is a first example of the embedded desk ejected from the hard shell case. After the ejection button 104 is pressed, the embedded desk 103 may easily slide out of the hard shell case 102. In this example, the embedded desk 103 may slide out on the side of the hard shell case 102. The embedded desk 103 may have clips 105 attached to the top side of the ejected embedded desk 103. When the embedded desk 103 is folded over a keyboard, the clips 105 may be on the bottom of the embedded desk 103. The clips 105 may be used to attach to the opposite side of the hard shell case 102. The clips 105 may hold the embedded desk 103 in place when the embedded desk 103 is folded over the keyboard 106.

Figure 3:
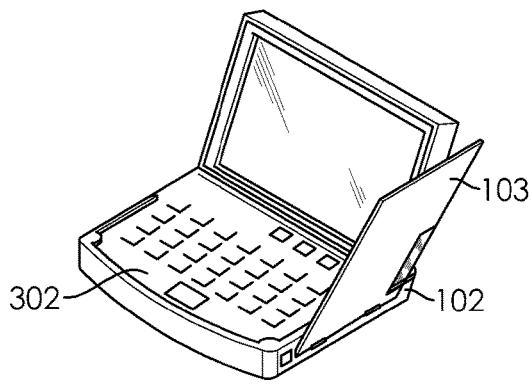
FIG. 3 is a first example of the embedded desk folded over a keyboard.

FIG. 3 is a first example of the embedded desk folded over a keyboard. The embedded desk 103, after sliding out of the hard shell case 102, may fold over the keyboard 302. When the embedded desk 103 is folded over the keyboard 302 a functional workspace is created. The clips (illustrated in FIG. 2) may attach to the opposite side of the hard shell case 102 to secure the embedded desk 103 in place.

Figure 4:
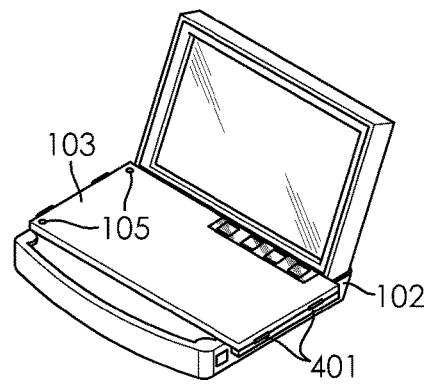
FIG. 4 is a second example of the embedded desk folded over a keyboard.

FIG. 4 is a second example of the embedded desk folded over the keyboard. The embedded desk 103 may fold over the keyboard 302 and secure in place by clips 105. As illustrated in FIG. 4, a pair of hinges 401 may be used to fold the embedded desk 103 over the keyboard 302. The embedded desk may have a single hinge as well, positioned in the center of the embedded desk 103.

The embedded desk 103 may also include a transparent corner 402. The transparent corner 402 may be made out of silicone or some other transparent, and easily manipulated, material. The play, pause, up and down scroll buttons, power, and volume buttons may remain accessible to the user in this transparent corner 402. These buttons may be protected by water proof silicone. The power 403 and USB ports may also remain accessible to the user.

Figure 5:
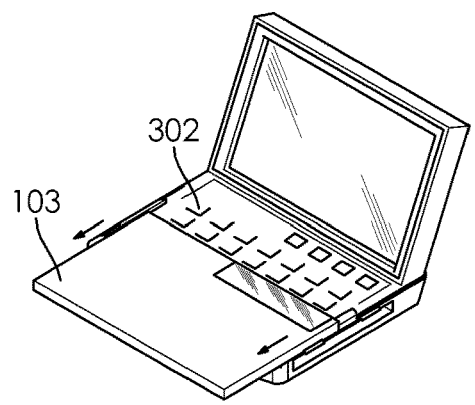
FIG. 5 is an example of the embedded desk sliding forward in front of the keyboard.

FIG. 5 is an example of the embedded desk sliding forward in front of the keyboard.

The embedded desk 103 may slide forward after it is folded over the keyboard 302. The embedded desk 103 may include a sliding arm (not shown) that allows the embedded desk 103 to slide forward, toward the user. This may allow the user to have access to the keyboard 302 and still have a functional workspace in a confined workspace.

Figure 6:
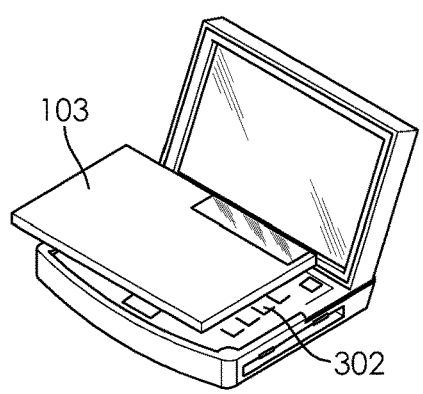
FIG. 6 is an example of the embedded desk shifting up over the keyboard.

FIG. 6 is an example of the embedded desk shifting up over the keyboard. In this example, the embedded desk 103 may extend up, over the keyboard 302, to allow a user access to the keyboard 302 underneath the embedded desk 103.

Figure 7:
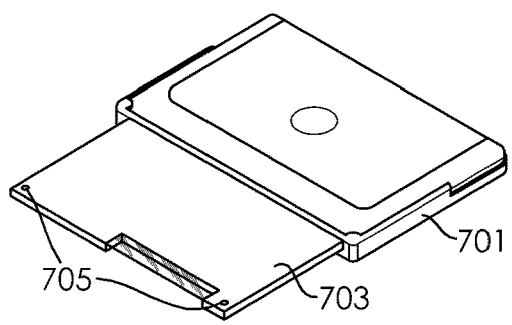
FIG. 7 is a second example of the embedded desk ejected from the hard shell case.

FIG. 7 is a second example of the embedded desk ejected from the hard shell case. An embedded desk 703 may eject out of the front of the hard shell case 701 when the ejection button is pressed. In this example, the embedded desk 703 may fold back over the keyboard (not shown in this example). The embedded desk 703 may include clips 705 attached to the top side of the ejected embedded desk 703. When the embedded desk 703 is folded over a keyboard, the clips 705 may be on the bottom of the embedded desk. The clips 705 may be used to attach to the opposite side of the hard shell case 701. The clips 705 may secure the embedded desk 703 in place when the embedded desk 703 is folded over the keyboard.

Figure 8:
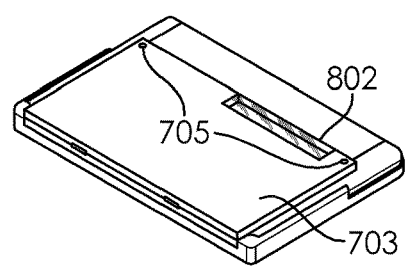
FIG. 8 is another example of the embedded desk folded over the keyboard.

FIG. 8 is another example of the embedded desk folded over the keyboard. The embedded desk 703 may fold over the keyboard and secure in place by clips 705. As illustrated in FIG. 8, hinges 801 may be used to fold the embedded desk 703 over the keyboard 702.

The embedded desk 703 may also include a transparent corner 802. The transparent corner 802 may be made out of silicone or some other transparent, and easily manipulated, material. The play, pause, up and down scroll buttons, power, and volume buttons may remain accessible to the user in this transparent corner 802. These buttons may be protected by water proof silicone. The power 803 and USB ports may also remain accessible to the user.

Figure 9:
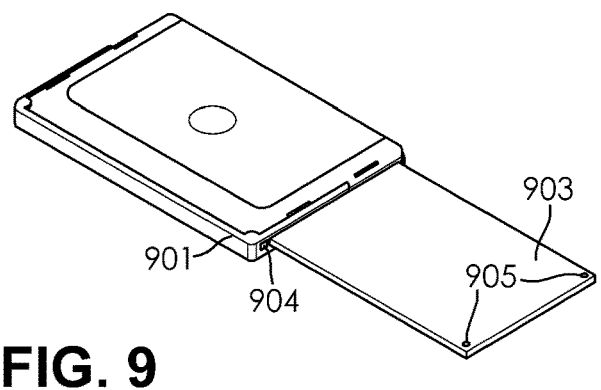
FIG. 9 is an example of the lapdesk with a hard shell case.

FIG. 9 is an example of the lapdesk with a hard shell case. The hard shell case 901 may include an embedded desk 903. The hard shell case 901 may have an ejection button 904 to eject the embedded desk 903 from the hard shell case 901. After the ejection button 904 is pressed, the embedded desk 903 may easily slide out of the hard shell case 901. In this example, the embedded desk 903 may slide out on the side of the hard shell case 901. The embedded desk 903 may have clips 905 attached to the top side of the ejected embedded desk 903. When the embedded desk 903 is folded over a keyboard (not shown), the clips 905 may be on the bottom of the embedded desk 903. The clips 905 may be used to attach to the opposite side of the hard shell case 901. The clips 905 may hold the embedded desk 903 in place when the embedded desk 903 is folded over the keyboard 106.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed:

1. A lapdesk comprising:
   a hard shell;
   an ejection button; and
   an embedded desk;
   wherein the embedded desk is ejected from the hard shell case after the ejection button is pushed;
   wherein the embedded desk is folded over a keyboard of a laptop to create a functional workspace.

2. The lapdesk of claim 1, wherein the embedded desk has clips attached to secure the embedded desk in place.

3. The lapdesk of claim 1, wherein the embedded desk has at least one hinge.

4. The lapdesk of claim 1, wherein the embedded desk has a transparent corner.

5. The lapdesk of claim 4, wherein the transparent corner is a waterproof silicone.

6. The lapdesk of claim 1, wherein the embedded desk slides forward.

7. The lapdesk of claim 1, wherein the embedded desk slides up.

8. The lapdesk of claim 1, wherein the embedded desk is ejected from a side of the hard shell case.

9. The lapdesk of claim 1, wherein the embedded desk is ejected from a front of the hard shell case.

10. A method for operating a lapdesk, the method comprising:
    putting a hard shell case on a laptop;
    pushing an ejection button on the hard shell case;

sliding out an embedded desk;
folding the embedded desk over a laptop keyboard; and
securing the embedded desk to create a functional workspace.

11. The method of claim 10, wherein the embedded desk has clips attached to secure the embedded desk in place.

12. The method of claim 10, wherein the embedded desk has at least one hinge.

13. The method of claim 10, wherein the embedded desk has a transparent corner.

14. The method of claim 13, wherein the transparent corner is a waterproof silicone.

15. The method of claim 10, wherein the embedded desk slides forward.

16. The method of claim 10, wherein the embedded desk slides up.

17. The method of claim 10, wherein the embedded desk is ejected from a side of the hard shell case.

18. The method of claim 10, wherein the embedded desk is ejected from a front of the hard shell case.

* * * * *